United States Patent
Reis et al.

(10) Patent No.: US 10,803,490 B2
(45) Date of Patent: Oct. 13, 2020

(54) REBROADCASTING OF ADVERTISEMENTS IN A SOCIAL NETWORK

(71) Applicant: Google LLC, Mountain View, CA (US)

(72) Inventors: Davi De Castro Reis, BeloHorizonte (BR); Rob Figueiredo, Belo Horizonte (BR)

(73) Assignee: Google LLC

( * ) Notice: Subject to any disclaimer, the term of this patent is extended or adjusted under 35 U.S.C. 154(b) by 50 days.

(21) Appl. No.: 15/095,244

(22) Filed: Apr. 11, 2016

(65) Prior Publication Data

US 2016/0225032 A1    Aug. 4, 2016

Related U.S. Application Data

(63) Continuation of application No. 13/939,686, filed on Jul. 11, 2013, now Pat. No. 9,342,844, which is a
(Continued)

(51) Int. Cl.
*G06Q 30/02* (2012.01)
*G06Q 50/00* (2012.01)

(52) U.S. Cl.
CPC ......... *G06Q 30/0269* (2013.01); *G06Q 30/02* (2013.01); *G06Q 30/0242* (2013.01);
(Continued)

(58) Field of Classification Search
CPC .................................................... G06Q 30/02
See application file for complete search history.

(56) References Cited

U.S. PATENT DOCUMENTS 5,950,173 A    9/1999   Perkowski
6,985,885 B1 *  1/2006   Goldberg ............... G06Q 30/06
                                                        705/26.3
(Continued)

FOREIGN PATENT DOCUMENTS

KR   2000-0064105   11/2000
KR   2001-0035449    5/2001
(Continued)

OTHER PUBLICATIONS

Notice from the European Patent Office dated Oct. 1, 2007 concerning business methods, Official Journal of the European Patent Office, 30(11):592-593, Nov. 1, 2007.
(Continued)

*Primary Examiner* — Vincent M Cao
(74) *Attorney, Agent, or Firm* — Fish & Richardson P.C.

(57) ABSTRACT

The subject matter of this specification can be embodied in, among other things, a method that receives at a server a first request to rebroadcast a first sponsored content item that was displayed on the social network to the first user to a second user. A second request to display at least one sponsored content item to the second user when the second user accesses an electronic document associated with the social network is received at the server. The first sponsored content item is retrieved for rebroadcast from one or more sponsored content items indicated for rebroadcast to the second user. The first sponsored content item is output to the second user of the social network in response to the second request to display and without requiring the second user to select the first sponsored content item for display.

24 Claims, 10 Drawing Sheets

Related U.S. Application Data continuation of application No. 12/392,033, filed on Feb. 24, 2009, now Pat. No. 8,489,458.

(52) U.S. Cl.
CPC ..... *G06Q 30/0251* (2013.01); *G06Q 30/0255* (2013.01); *G06Q 30/0257* (2013.01); *G06Q 30/0275* (2013.01); *G06Q 30/0277* (2013.01); *G06Q 50/01* (2013.01); *G06Q 30/0271* (2013.01)

(56) References Cited

U.S. PATENT DOCUMENTS

| | | |
|---|---|---|
| 7,031,932 B1 | 4/2006 | Lipsky et al. |
| 7,599,950 B2 | 10/2009 | Walther et al. |
| 7,665,107 B2 | 2/2010 | Goodman et al. |
| 7,801,956 B1 | 9/2010 | Cumberbatch et al. |
| 7,962,853 B2 | 6/2011 | Bedi et al. |
| 8,135,800 B1 | 3/2012 | Walsh et al. |
| 9,002,410 B2 | 4/2015 | Tsui |
| 9,076,148 B2* | 7/2015 | Valz ................ G06Q 30/02 |
| 2001/0021934 A1 | 9/2001 | Yokoi |
| 2002/0107787 A1 | 8/2002 | Mashinsky et al. |
| 2002/0109736 A1 | 8/2002 | Chailleux |
| 2002/0147656 A1 | 10/2002 | Tam et al. |
| 2002/0178054 A1 | 11/2002 | Ader |
| 2002/0184095 A1 | 12/2002 | Scullard et al. |
| 2005/0256866 A1 | 11/2005 | Lu et al. |
| 2005/0278443 A1 | 12/2005 | Winner et al. |
| 2005/0283497 A1 | 12/2005 | Nurnainen et al. |
| 2006/0200435 A1 | 9/2006 | Flinn et al. |
| 2006/0212355 A1 | 9/2006 | Teague et al. |
| 2006/0212452 A1 | 9/2006 | Cornacchia, III |
| 2006/0218153 A1 | 9/2006 | Voon et al. |
| 2006/0218577 A1* | 9/2006 | Goodman .............. G06Q 30/02 725/32 |
| 2006/0224721 A1 | 10/2006 | Rowe et al. |
| 2006/0242581 A1 | 10/2006 | Manion et al. |
| 2007/0106551 A1 | 5/2007 | McGucken |
| 2007/0112761 A1 | 5/2007 | Xu et al. |
| 2007/0121843 A1 | 5/2007 | Atazky et al. |
| 2007/0173084 A1 | 7/2007 | Wang |
| 2007/0179857 A1 | 8/2007 | Collins |
| 2007/0180031 A1 | 8/2007 | Stern et al. |
| 2008/0059992 A1 | 3/2008 | Amidon et al. |
| 2008/0071616 A1* | 3/2008 | Hovnanian ........... G06Q 30/02 705/14.54 |
| 2008/0103907 A1 | 5/2008 | Maislos et al. |
| 2008/0147482 A1 | 6/2008 | Messing et al. |
| 2008/0147487 A1 | 6/2008 | Hirshberg |
| 2008/0162329 A1* | 7/2008 | Knapp ................. G06Q 30/02 705/37 |
| 2008/0189169 A1 | 8/2008 | Turpin et al. |
| 2008/0189174 A1 | 8/2008 | Moore |
| 2008/0195466 A1 | 8/2008 | Wright |
| 2008/0232561 A1* | 9/2008 | Hildreth ............... G06Q 30/02 379/88.22 |
| 2008/0256233 A1 | 10/2008 | Hall et al. |
| 2009/0018915 A1* | 1/2009 | Fisse .................. G06Q 30/02 705/14.19 |
| 2009/0048922 A1 | 2/2009 | Morgenstern et al. |
| 2009/0070219 A1 | 3/2009 | D'Angelo |
| 2009/0076912 A1 | 3/2009 | Rajan et al. |
| 2009/0083095 A1* | 3/2009 | Crane-Baker .......... G06Q 10/00 705/7.29 |
| 2009/0125511 A1 | 5/2009 | Kumar |
| 2009/0138348 A1 | 5/2009 | Higgins et al. |
| 2009/0198566 A1 | 8/2009 | Greenberg |
| 2009/0199230 A1* | 8/2009 | Kumar ................. G06Q 30/02 725/32 |
| 2009/0216620 A1 | 8/2009 | Lee |
| 2009/0216859 A1 | 8/2009 | Dolling |
| 2009/0222348 A1 | 9/2009 | Ransom et al. |
| 2009/0228335 A1 | 9/2009 | Niyogi et al. |
| 2009/0248516 A1 | 10/2009 | Gross |
| 2009/0292608 A1 | 11/2009 | Polachek |
| 2009/0319288 A1 | 12/2009 | Slaney et al. |
| 2009/0319359 A1 | 12/2009 | Soza et al. |
| 2010/0010866 A1 | 1/2010 | Bal et al. |
| 2010/0042470 A1 | 2/2010 | Chang et al. |
| 2010/0042471 A1 | 2/2010 | Chang et al. |
| 2010/0057546 A1 | 3/2010 | Wang et al. |
| 2010/0082403 A1 | 4/2010 | Higgins et al. |
| 2010/0088246 A1 | 4/2010 | Lim |
| 2010/0100495 A1 | 4/2010 | Maksimow |
| 2010/0131364 A1* | 5/2010 | Gonen ................. G06Q 30/02 705/14.54 |
| 2010/0153411 A1 | 6/2010 | Toebes et al. |
| 2010/0217670 A1 | 8/2010 | Reis et al. |
| 2010/0318611 A1 | 12/2010 | Curtin et al. |
| 2011/0041168 A1 | 2/2011 | Murray et al. |
| 2012/0253972 A1* | 10/2012 | Oskolkov ............. G06Q 30/02 705/26.8 |
| 2013/0080225 A1* | 3/2013 | Rajaram ............... G06Q 50/01 705/14.16 |
| 2013/0304569 A1 | 11/2013 | Reis et al. |

FOREIGN PATENT DOCUMENTS

| | | |
|---|---|---|
| KR | 2002-0068682 | 8/2002 |
| KR | 2003-0076545 | 9/2003 |

OTHER PUBLICATIONS

Extended European Search Report in European Application No. 10746708.6, dated Apr. 28, 2014, 7 pages.

International Search Report & Written Opinion for Application No. PCT/US10/25065, dated Apr. 16, 2010, 8 pages.

International Preliminary Report on Patentability for Application No. PCT/US2010/025065, dated Sep. 9, 2011, 7 pages.

Facebook Home Page [online]. Retrieved on Jan. 6, 2009. Retrieved from the Internet: <URL: http://www.facebook.com/home.php>.

Facebook Posted Items FAQ [online]. Retrieved on Jan. 5, 2009. Retrieved from the Internet: <URL: http://www.facebook.com/help.php?topic=posted_items>.

Facebook Receipt of Shared Story [online]. Retrieved on Jan. 6, 2009. Retrieved from the Internet: <URL: http://www.facebook.com/home.php>.

Facebook Sharing Dialog Box [online]. Retrieved on Jan. 6, 2009. Retrieved from the Internet: <URL: http://www.facebook.com/home.php>.

Google Reader Adds "Share With Note" Feature [online]. Posted May 6, 2008. Retrieved from the Internet.

Google Reader Blog—News, Tips, and Tricks from the Google Reader Team [online]. Posted May 5, 2008 [retrieved on Jan. 5, 2009]. Retrieved from the Internet: <URL: http://googlereader.blogspot.com/2008/05/share-anything-anytime-anywhere>.

Google Reader Help (Google Labs) [online]. Retrieved on Jan. 5, 2009. Retrieved from the Internet: <URL: http://www.google.com/help/faq_reader.html>.

Mccarthy, M. Facebook Ads Make You the Star—and You May Not Know It [online], Jan. 2, 2008 [retrieved on Jan. 5, 2009]. Retrieved from the Internet: <URL: http://blog.wired.com/business/2008/01/facebook-ads-ma.html>.

Merriam-Webster's Collegiate Dictionary, Tenth Edition (Merriam-Webster, Incorporated, 1998) at p. 485.

Reddit Friend Preference Homepage [online]. Retrieved on Jan. 5, 2009. Retrieved from the Internet: <URL: http://www.reddit.com/prefs.friends/>.

Steve (Spez). 'Sponsored Links on Reddit'. In BLOG.reddit [online]. Posted Jan. 3, 2009 [retrieved on Jan. 5, 2009]. Retrieved from the Internet: <URL: http://blog.reddit.com/2009/01/1sponsored-links-on-reddit.html>.

Webb, R. Facebook Quietly Launches Advertising Feedback [online]. Posted Jun. 5, 2008 [retrieved Jan. 5, 2009]. Retrieved from the Internet: <URL: http://blog.robwebb2k.com/2008/06/05/facebook-quietly-launches-advertising>.

(56) References Cited

OTHER PUBLICATIONS

BR Office Action in Brazilian Application No. PI1013357-7, dated Aug. 24, 2019, 29 pages.
EPO, "Notice from the European Patent Office dated Oct. 1, 2007 concerning business methods," dated Nov. 2007, pp. 592-593.

* cited by examiner

FIG. 8

REBROADCASTING OF ADVERTISEMENTS IN A SOCIAL NETWORK

CROSS-REFERENCE TO RELATED APPLICATIONS

This application is a continuation application of and claims priority to U.S. application Ser. No. 13/939,686, filed on Jul. 11, 2013, which claims priority to U.S. application Ser. No. 12/392,033, filed on Feb. 24, 2009, the entire contents of which are hereby incorporated by reference.

TECHNICAL FIELD

This document generally describes transmitting advertisements.

BACKGROUND

Social networks offer individuals great opportunities to communicate and stay in touch with others. Monetizing the networks and supporting features offered to users, however, has been historically difficult. Often advertisements are not well targeted to users (e.g., ads may be targeted to mostly static profile information, which may lead to a static set of ads or a lack of diversity within the shown advertisements). Users typically begin to ignore the advertisements after a period of display. Further, advertisers may not receive adequate feedback on the quality of their advertisements.

SUMMARY

In general, this document describes transmitting, or rebroadcasting, advertisements from one user of a social network to other users. For example, a user may like an advertisement (ad) and select the ad for rebroadcasting to his or her friends. In this way, the display of ads can incorporate a social aspect, where users forward ads they think will be particularly relevant or of interest to their friends or other social network users.

One aspect of the disclosure features a computer-implemented method that determines for a first user of a social network one or more second users of the social network having an acquaintance relationship with the first user and receives at a server from the first user a first request to rebroadcast a first sponsored content item that was displayed on the social network to the first user to a second user of the determined one or more second users. A second request is received at the server to display at least one sponsored content item to the second user when the second user accesses an electronic document associated with the social network. The first sponsored content item is retrieved for rebroadcast from one or more sponsored content items indicated for rebroadcast to the second user. The first sponsored content item is output to the second user of the social network in response to the second request to display the at least one sponsored content item and without requiring the second user to select the first sponsored content item for display.

Another aspect of the disclosure features a system including one or more servers to receive a request from a first user of a social network to rebroadcast a first sponsored content item that was displayed to the first user to a second user of the social network. The system also includes means for selecting the first sponsored content item from one or more sponsored content items indicated for rebroadcasting to the second user when the second user accesses an electronic document associated with the social network. The system further includes an interface to output the first sponsored content item for viewing by the second user.

Another aspect of the disclosure features a method that receives a generated sponsored content item for initial display to one or more first users of a social network, and receives a request from at least a portion of the one or more first users that the sponsored content item be rebroadcast to a second set of users of the social network. The second set of users are related to the portion of first users through acquaintance relationships within the social network. The sponsored content item is output to the second set of users and presented in a format that enables the second set of users and subsequent recipient users to rebroadcast the sponsored content item to other users of the social network.

In some examples, the first sponsored content item displayed to the second user further comprises a badge indicating that the first sponsored content item has been rebroadcast by the first user. The badge may be associated with a plurality of indicators that identify users who have rebroadcast the first sponsored content item for display to the second user.

In various examples, the first sponsored content item is selected from a plurality of user-generated and commercial entity-generated sponsored content items.

In some examples, the method receives from the second user a third request that the first sponsored content item be rebroadcast to a third user of the social network.

The method, in some applications, receives from the first user a message to be displayed with the first sponsored content item to the second user.

In various implementations, the first request to rebroadcast the first sponsored content item to the second user is part of a request to rebroadcast the first sponsored content item to a group of users of which the second user is a member. In some examples, the method outputs the first sponsored content item for display to each other user in the group. In various examples, the method determines members of the group based on an identification of users having an acquaintance relationship with the first user. The method refines a selection of the members based on whether the users have interests that are associated with content of the first sponsored content item, in some aspects. The method, in various examples, may determine the interests of the users based on content generated on the social network by the users.

In some examples, the method receives an indication that the first user no longer desires to view the first sponsored content item. The indication may be generated based on an express action from the first user indicating that first user is not interested in the first sponsored content item.

In various examples, retrieving the first sponsored content item from the one or more sponsored content items includes generating scores for each of the one or more sponsored content items and selecting for retrieval an sponsored content item having a highest ranked score.

In some examples, a generated score is based on a first sponsored content item's history of rebroadcasts, history of selections by a recipient user, history of impressions shown, or history of indications that a recipient user is not interested in the sponsored content item. A generated score is based on a second user's history of rebroadcasting the first user's rebroadcasts, in some applications. In other applications, a generated score is based on history information associated with the first sponsored content item or the first user, the history information specific to interactions with the second user or all users.

The method outputs to the first user or to an entity associated with a creation of the first sponsored content item an indication of a penetration of the rebroadcast into the social network, in some applications. In some implementations, the method outputs to the first user or to an entity associated with a creation of the first sponsored content item an indication of a number of rebroadcasts of the first sponsored content item by other users. In various examples, the method outputs to the first user or to an entity associated with a creation of the first sponsored content item an indication of a number of users that indicated a desire to no longer view the first sponsored content item, in some applications.

The systems and techniques described here may provide one or more of the following advantages. First, an alleviation of ad blindness may be provided. For example, users of social networks may begin to ignore ads on social networks after a period of display. The interactive nature of rebroadcasting ads to other users may draw attention to the ads, and consequently, generate better responses from viewers (e.g., click-through rates). Another benefit may arise from direct feedback provided to advertisers on which ads are selected by users for rebroadcasting and which are not. An additional benefit may arise from a viral affect, where popular ads cascade through the social network, generating user interest and creating a "buzz." A further benefit is the ability for advertisers to broadcast ads with the social network's own advertising system instead of a complex general advertisement system. Another benefit is that the system may encourage high quality content in ads.

The details of one or more embodiments are set forth in the accompanying drawings and the description below. Other features, objects, and advantages of the invention will be apparent from the description and drawings, and from the claims.

DESCRIPTION OF DRAWINGS

FIG. 8 is an example screenshot of a web page 800 displaying advertisement statistics.

DETAILED DESCRIPTION

Figure 1A:
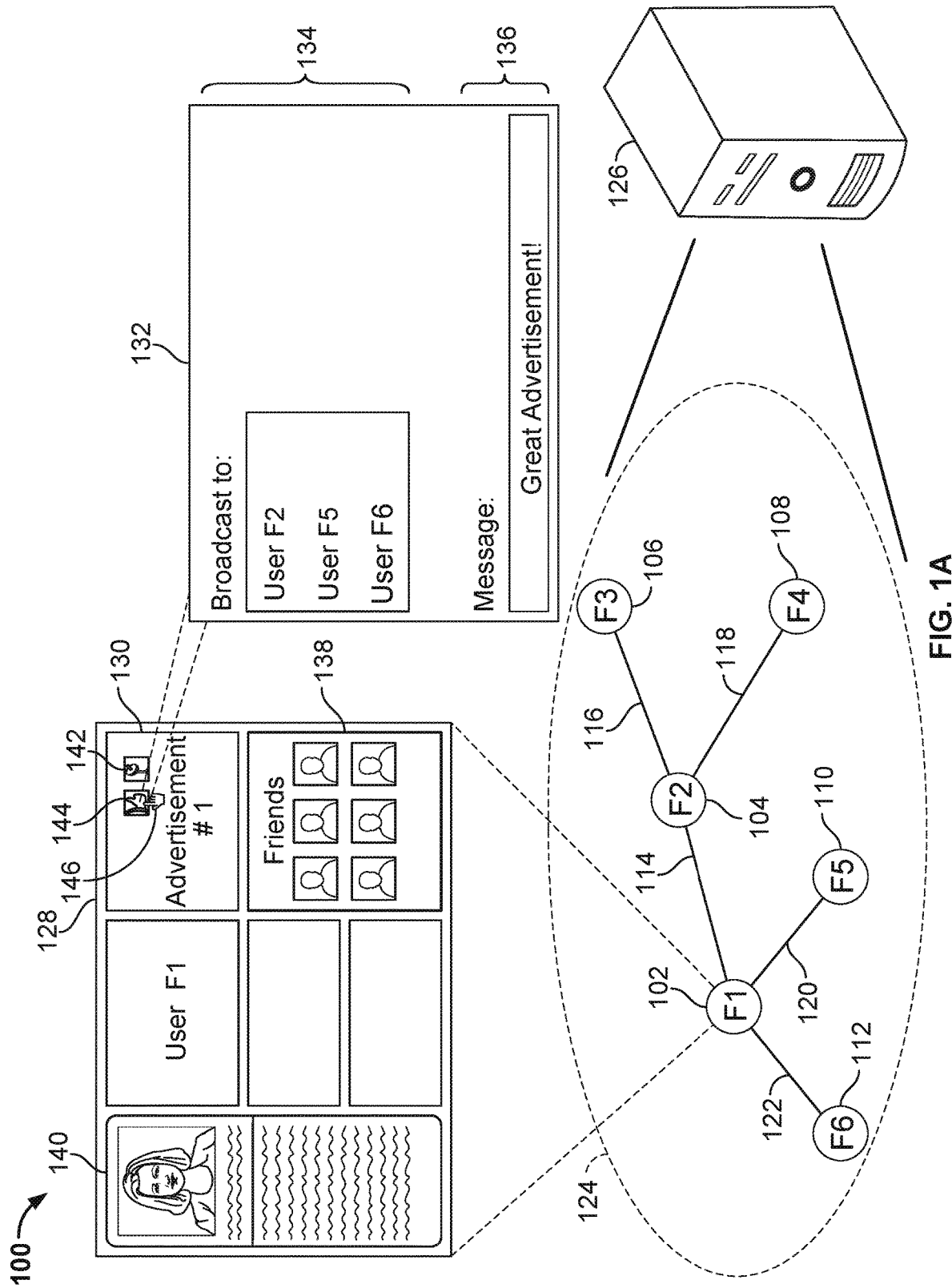
FIG. 1A is a diagram of an example system for rebroadcasting advertisements.

This document generally describes a social network where users of the social network can rebroadcast sponsored content items (e.g., advertisements or ads) that they have viewed to other recipient users. In some implementations, a user may view sponsored content items on one or more pages of the social network. A user may select one of the sponsored content items displayed to the user and rebroadcast, or electronically distribute, the sponsored content item to other recipient users of the social network. For example, a user may choose to rebroadcast the sponsored content item to specific users, groups of users, or networks of users.

In some implementations, the sponsored content may include an advertisement for a commercial product or a commercial service. The sponsor of the content may not be a user of the social network. In other implementations, the sponsored content may be provided by a user of the social network. The content or advertisement provided by the social network user may be commercial or non-commercial in nature.

In some implementations, a user rebroadcasting an advertisement (i.e., an originating user) may not specify recipient users, and the social network can automatically determine the recipients. For example, the social network may automatically determine that all friends of the originating user (e.g., users agreeing to a social network relationship with the originating user) should receive the rebroadcast advertisement. Further, the social network may automatically determine that all friends of the friends of the originating user should receive the rebroadcast ad. In this implementation, the social network may be said to broadcast to the users at a depth of two from the originating user.

In some implementations, an originating user may enter a message with a rebroadcast ad for display to recipient users. In other implementations, users of the network may "trash" an ad so that it will no longer appear to them. For example, an ad may include a button that, when clicked by a user, causes the ad to either disappear immediately, to not reappear to the user on the social network, or to make it less likely that the ad will be shown to either his friends or other users.

The social network may present the rebroadcast ad to the recipient users. A badge may accompany the rebroadcast ad to indicate that the ad was rebroadcast by an originating user. In some implementations, the badge may provide indicators of originating users that have selected the ad for rebroadcast to a recipient user. In some implementations, recipient users may view a message sent by the originating user. For example, the originating user may choose to rebroadcast an ad to recipient users with the message: "Great Advertisement!" The rebroadcast ad may then display to the recipient users, accompanied by the message "Great Advertisement!"

Recipient users may repeat the process, becoming originating users themselves and rebroadcasting the ad to new recipient users. In some implementations, traditional advertising systems may create the content the broadcast ad, social networking advertising systems may provide the ad, or social network users may create the ad.

FIG. 1A is a diagram of an example system for rebroadcasting ads. The system may include a social network 100 that resides on a server 126. In some implementations, this social network 100 may be represented as a social network graph 124. For example, the social network 100 may include a plurality of users represented by nodes in the graph 124, such as F1 (102), F2 (104), F3, (106), F4 (108), F5 (110), and F6 (112). Users that have an association with each other may be connected by links (e.g. 114, 116, 118, 120, 122 in the graph 124).

A user of the social network may view a page 128 that is associated with user F1. This page may display an advertisement 130. In some implementations, a user clicking on the advertisement 130 may prompt a dialog box 132 for rebroadcasting the advertisement 130 to recipient users.

In FIG. 1A, page 128 is associated with user F1. In some implementations, this page (e.g., an electronic document associated with the social network) is a personal page of F1 that F1 or other users can view (e.g., possibly only users with an acquaintance relationship to F2 can view the page 128). A personal page may contain user-generated content such as F1's picture 140 and a list of F1's friends 138, among other personal information. A personal page may also be a page associated with a user but containing content generated by the network. For example, the personal page may display recent activity of the user on the social network or include information associated with the user but generated by other users of the social network.

In some implementations, page 140 is a page that F1 may visit. For example, page 140 could be a personal page of F1, but could also be another user's personal page, an advertiser's page, a page for a group of users, or a page for a network of users. In some implementations, page 140 resides within a separate, associated social network.

Advertisement 130 may include or be associated with interactive portions of page 140 that when selected perform an operation. For example, one such interactive portion may be a rebroadcast button 144 that permits an originating user to rebroadcast the advertisement 130 to recipient users. In one implementation, clicking the rebroadcast button 144 activates a dialog box 132. The dialog box may display options for rebroadcasting the advertisement. For example, an address field 134 may permit the originating user to select specific recipient users and a message field 136 may permit the originating user to send a message to the recipient users.

In some implementations, a message field 136 may permit the originating user F1 to provide a message to the recipient users. For instance originating user F1 may provide the message "Great Advertisement!"

In some implementations, the originating user may select as recipient users specific users, specific email addresses, all users of an originating user-created group, all users of a voluntarily associated group, all users of a network, or any combination of the above. For example, in address field 134 of social network 100, originating user F1 is specifically rebroadcasting advertisement 130 to recipient users F2 (104), (110), and F6 (112).

In some implementations, an originating user may not specify recipient users and the social network automatically determines the recipients. For example, the social network may automatically determine that friends of the originating user and all friends of the friends of the originating user should receive the rebroadcast advertisement. In this implementation, the social network may be said to rebroadcast to recipient users to a depth of two from the originating user. In such example in social network 100, users F2, F3, F4, F5, and F6 may receive a rebroadcast advertisement to a depth of two from originating user F1. Recipient users F3 and F4 may be considered at a depth of two while recipient users F2, F5, and F6 may be considered at a depth of one. If, for example, recipient user F3 was also connected to originating user F1 by a link, recipient user F3 may be considered at a depth of one.

In some implementations, page 140 includes, for example, a trash button 142 associated with the advertisement 130. A user's selection of this button may indicate that the user no longer desires to view the advertisement. The advertisement 130 may then disappear, be replaced by another advertisement, or remain on the page. The advertisement 130 may then appear with less frequency in the future or never appear again. Trashing may impact the display of advertisements related to the trashed advertisement.

In some implementations, the interaction portion of the page may be a link, radio button, mouse-over area, or other selectable portion of page 140 or advertisement 130. In some implementations, the interactive portion of the page is selected by clicking with a mouse pointer 146, tapping on a touch screen, hovering over a selectable area with a mouse pointer, etc. In some implementations, the dialog box 132 may be provided as a separate page, pop-up box, drop down dialog box, expandable portion of the page, etc.

Social network 100 may display advertisement 130 within pages of the social network (e.g. page 128). This advertisement may include text, image, map, sound, gadget, or video. In some implementations, the advertisement includes a "headline" and a "body." For example, the headline may display like a news ticker. If a user selects the headline, a "body" may reveal with additional information. In some implementations, the advertisement includes a standard 250×250 pixel advertisement block.

In some implementations, an advertisement may provide click-throughs that stay within the social network. For example, a user clicking on an advertisement may be directed to the advertiser's social network page or to a social network group or event. In some implementations, the advertisement may provides click-throughs that leave the social network, for example to an advertiser's website or a third-party website. In some implementations, an advertisement provides no click-throughs, but instead may present text, a pop-up box, animation, sound, etc. upon a user selecting the advertisement.

In some implementations, the social network 100 may be represented by a social network graph 124, as discussed previously. The links of the graph 124 may indicate various types of acquaintance relationships between users of a social network. In some implementations the acquaintanceship relationships may be bi-lateral relationships. For example, two users of the social network may have agreed to be acquaintances of each other or otherwise acknowledged or affirmed an acquaintanceship relationship. The link may indicate that the users have agreed to be social friends. For example, one user may request to be the friend of a second user and the second user agrees. In some implementations, the links indicate an acquaintance relationship where one user has merely requested to be the friend of another user, where one user has sent a message to another user, or where one user has viewed the personal page of another user.

Depending upon the acquaintance relationship, linked users may access varying levels of information about each other. In some implementations, both users may view personal information otherwise not shared with other users of the social network. Social network 100 and social network graph 124 present example representations of acquaintance relationships in a social network. For example, a social network may contain more than six users, users of a social network may have more than three friends, and the number of depths may reach past two. In some implementations, an acquaintanceship relationship may be a unilateral relationship. For example, a user of the social network may have requested to be an acquaintance of or sent a message to another user that has not otherwise acknowledged an acquaintanceship between the two users.

The social network represented by nodal representation 124 may reside within, operate on, or be accessed by server 126. It is understood that this server is only shown as a single device for illustrative purposes and may consist of numerous such devices.

Figure 1B:
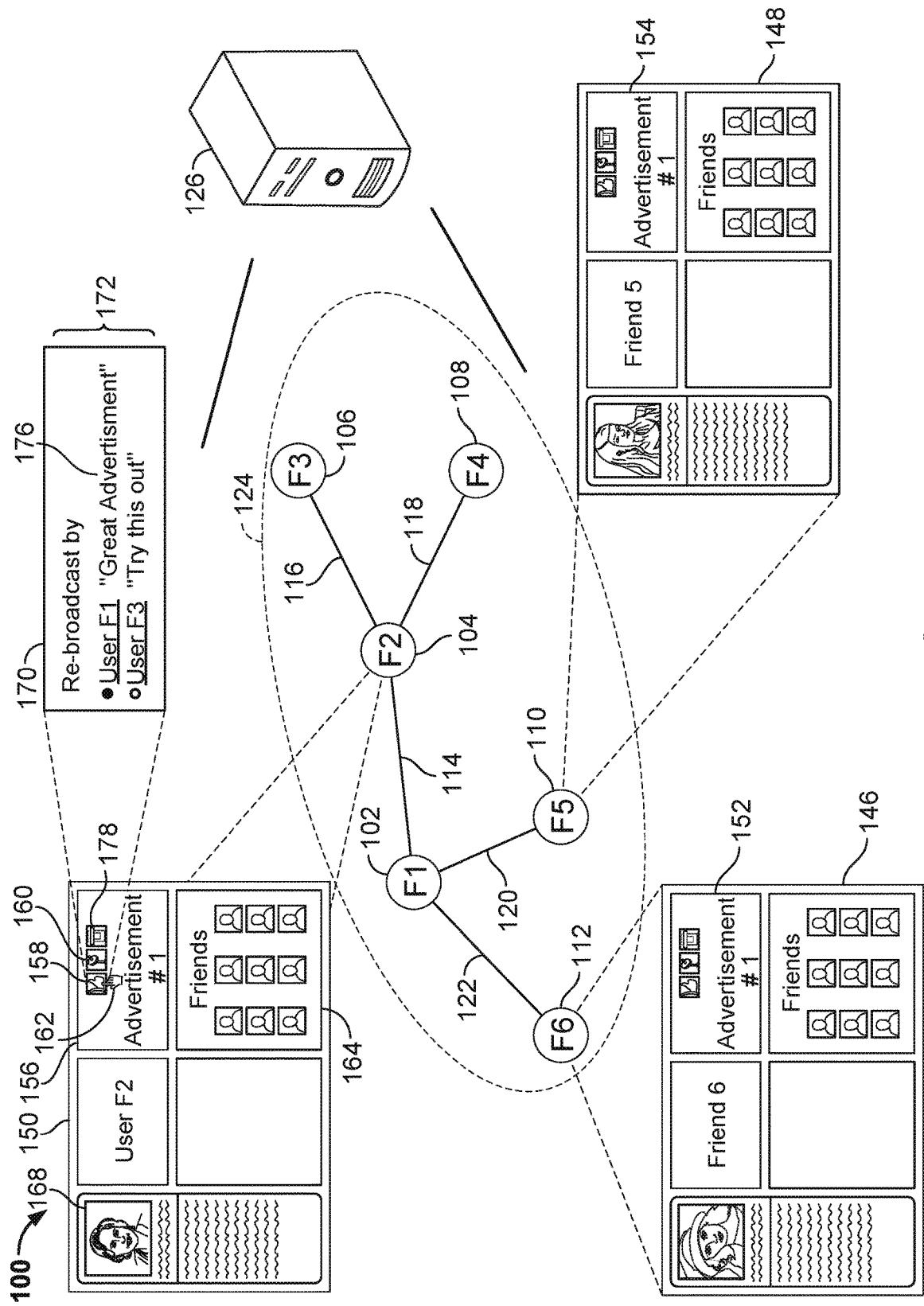
FIG. 1B is a diagram of an example system for rebroadcasting advertisements.

FIG. 1B is a diagram of an example system after an advertisement has been rebroadcast. This example shows a time after the advertisement 130 has been rebroadcast by the originating user F1. In addition to the page 128, the social network 100 may further include pages 150, 140, and 146, respectively associated with recipient users F2 (104), F5 (110), and F6 (112). In some implementations, pages 150, 140, and 146 may share the implementation or template of page 128 of FIG. 1A. Pages 150, 140, and 146 may respectively display advertisements 156, 154, and 152, where these advertisements are rebroadcasts of advertisement 130 of FIG. 1A. The advertisements 156, 154, and 152 may be the same as or similar to advertisement 130 of FIG. 1A.

In some implementations, a badge may accompany advertisement 156 that indicates that the advertisement was rebroadcast by one or more originating users. For example, advertisement 156 may display an expand button 158 that is not present in advertisement 130 of FIG. 1A. In some implementations, the badge 156 may indicate which originating users have selected the advertisement for rebroadcast to a recipient user. For example, rebroadcast list 172 may indicate that user F1 and user F3 rebroadcast advertisement 156 to user F2.

In some implementations, the badge may include or be associated with an interactive portion of page 150. For example, clicking the expand button 158 activates a dialog box 170. The dialog box 170 may display a rebroadcasting list 172 of users that rebroadcast to the recipient user the advertisement 156. In some implementations, the page 150 or dialog box 170 may contain messages from one or more originating users. For example, message 176 in rebroadcasting list 172 may be from user F1 and the same as message 136 in FIG. 1A.

In some implementations, advertisement 156 may include or be associated with a rebroadcast button 160 similar to rebroadcast button 142 FIG. 1A. In some implementations, advertisement 156 may include or be associated with a trash button 178 similar to trash button 142 of FIG. 1A. Pages 152, 154 and advertisements 146, 148 may contain functions and buttons similar to page 150 and advertisement 156. Pages 152, 154, and 150 may contain functions and buttons similar to page 128 of FIG. 1A.

In some implementations, recipient users may repeat the entire process, becoming originating users themselves and rebroadcasting the advertisement to new recipient users. For example, recipient user F2 may rebroadcast to other social network users the advertisement rebroadcast by originating user F1, effectively making user F2 an originating user.

Figure 2:
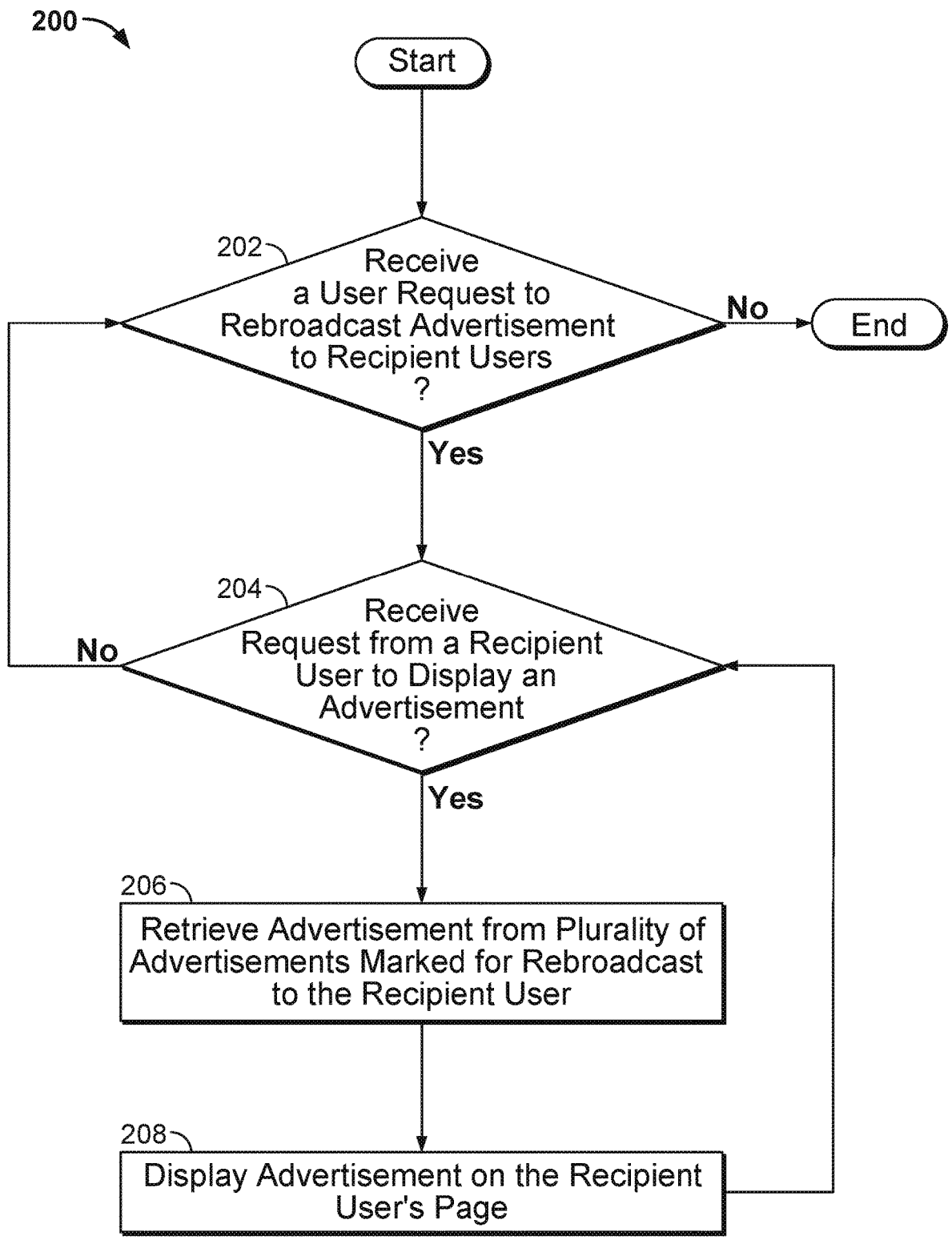
FIG. 2 is a flow chart of an exemplary process 200 for user rebroadcasting of advertisements in a social network.

FIG. 2 is a flow chart of an example process 200 for user rebroadcasting of advertisements in a social network. The process 200 may be performed, for example, by a system such as the systems in FIG. 1A and FIG. 1B and, for clarity of presentation, the description that follows uses the systems in FIG. 1A and FIG. 1B as the basis of an example for describing the process. Another system or combination of systems, however, may be used to perform the process 200.

In box 202, a determination is made whether a user request is received to rebroadcast an advertisement to one or more recipient users (e.g. the user's friends). For example, user F1 (102) in FIG. 1A may see an advertisement that he likes. The user F1 (102) can select the rebroadcast button 144 to rebroadcast the advertisement to other users. The server 126 can detect the selection of the rebroadcast button and forward the advertisement to web pages that the users F2 (104), F5 (110), and F6 (112) are viewing or may view in the future. If no request is received, the process ends. If a request is received, the process performs the operation of box 204.

In box 204, a determination is made whether a request from a recipient user is received to display an advertisement. For example, the social network 100 in FIG. 1B may receive a request from user F2 (104) to display an advertisement on page 150. This may be an implicit request generated when a user F2 (104) accesses page 150 or the page being viewed by user F2 (104) reloads or refreshes If no request is received, the process performs the operation of box 202. If a request is received, the process performs the operation of box 206. In some implementations, the operation of box 204 may wait until all recipient users request an advertisement before performing the operation of box 202.

In box 206, an advertisement is retrieved from a plurality of advertisements that are marked for rebroadcast to the recipient user that requested to display an advertisement. For example, advertisement 130 in FIG. 1A may be marked by user F1 (102) for rebroadcast to user F2 (103) and added to the plurality of advertisements marked for display. Further, user F4 (108) may mark a second advertisement (not shown) for rebroadcast to user F2 (103) and similarly added to the plurality. One or more advertisements may then be retrieved from the plurality of advertisements.

In box 208, the retrieved advertisement is displayed on the recipient user's page. For example, advertisement 156 in FIG. 1B may be displayed on page 150 of user F2 (104). In some implementations a first retrieved advertisement may be displayed for 10 seconds and then rotated with a second retrieved advertisement.

Figure 3:
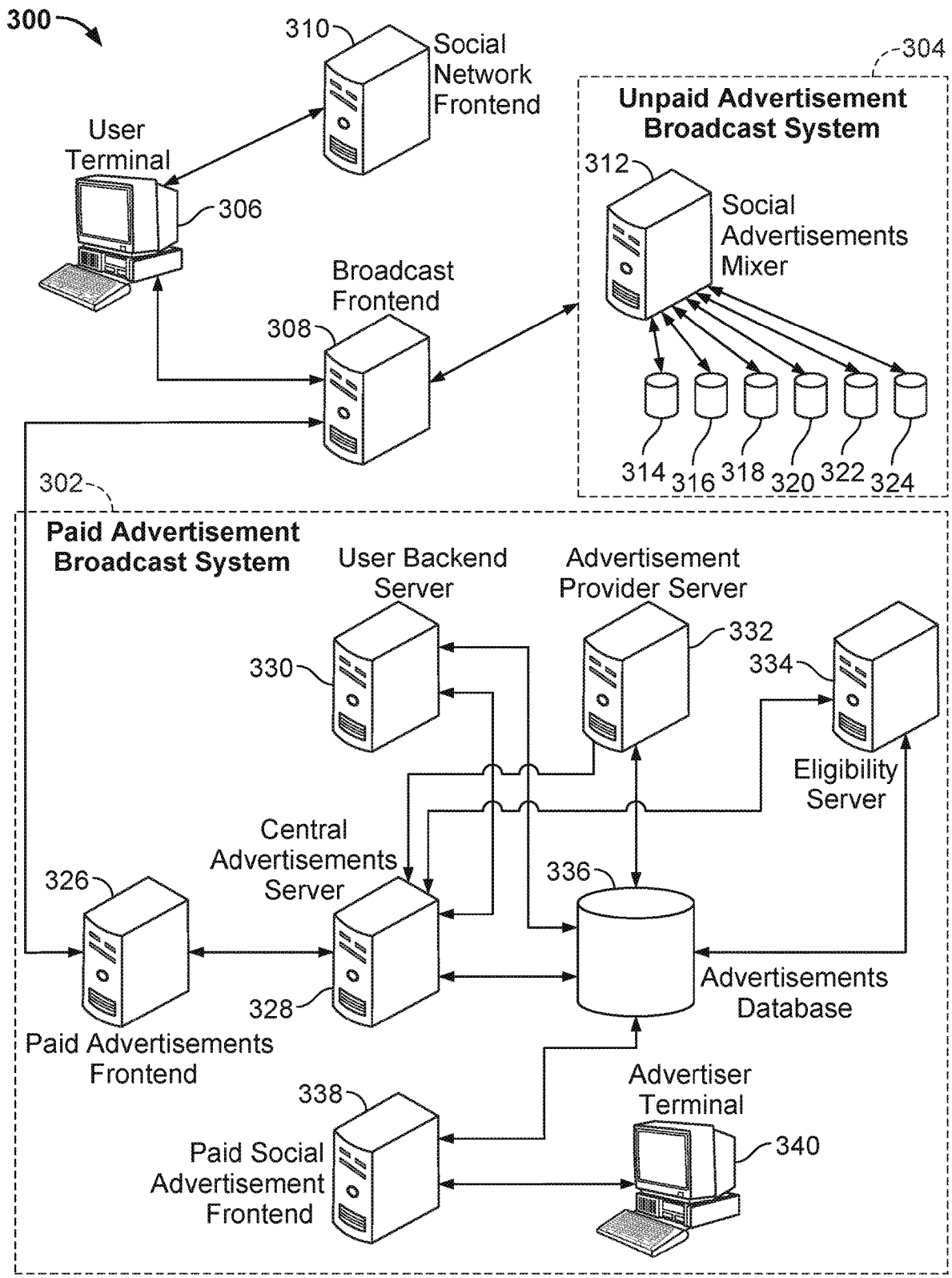
FIG. 3 is a diagram of an example system 300 for rebroadcasting advertisements.

FIG. 3 is a diagram of an example system 300 for rebroadcasting advertisements. The system may include a user terminal 306 that communicates with a social network frontend server 310 for loading portions of a web page of a social network and a broadcast frontend server 308 for loading one or more advertisements on the page 151. The broadcast frontend server 308 may communicate with an unpaid advertisement broadcast system 304 and a paid advertisement broadcast system 302, both described in greater detail later.

The user terminal 306 may display to a user of a social network one or more pages of the social network. For example, the user F1 (102) in FIG. 1A may use terminal 306 of FIG. 3 to access the social network 100 and view page 128.

The user terminal 306 may communicate with a social network frontend server 310 to receive portions of a page of the social network. For example, the portions of the page may include a picture of a user and a list of the user's friends. If, for example, the user F1 (102) in FIG. 1A accessed the social network through user terminal 306, the user terminal may receive from the social network frontend server picture 140 and friends list 138, among other portions of the page 128. In some implementations, the social network frontend server serves gadgets, such as mini xml-based applications that display content and allow a user to interact with the content. The gadgets, for example, may be used to display advertisements and permit users to rebroadcast the same.

In some implementations, the user terminal 306 may communicate with a broadcast frontend server 308 to receive one or more advertisements. For example, the user terminal 306 may send a HTTP request for an advertisement to broadcast frontend server 308. The broadcast frontend server may communicate with two systems, an unpaid advertisement broadcast system 304 and a paid advertisement broadcast system 302, to retrieve one or more advertisements. For example, the broadcast frontend server 308 may request an advertisement from either or both the unpaid advertisement broadcast system 304 and the paid advertisement broadcast system 302.

In selecting whether to show a paid or unpaid advertisement, the determination may be based upon a weight, quality, or relevance of the received advertisements. For example, an advertisement may have a greater weight if the content is time-critical or the advertisement will bring in greater revenue. The advertisement may have a greater quality if it has been rebroadcast several times. The advertisement may have a greater relevance if the user has rebroadcast similar advertisements in the past or users with similar preferences have rebroadcast the message. In some implementations, the broadcast frontend server 308 may provide both paid and unpaid advertisements, or alternate between the two types of advertisements.

In some implementations, an interface may be used to display the advertisements (e.g. an http or a TCP/IP interface used to transmit the advertisement for display). The interface may implement any application programming interface (API) or communication protocol. For example, the interface may implement the OpenSocial API. A gadget that displays advertisements may use the OpenSocial API to get information from the social network. The information may include friend lists, links to friends profile pages, friend's profile picture, etc.

In some implementations, the unpaid advertisement broadcast system 304 may include a social advertisements mixer server 312 and one or more databases (e.g. databases 314, 316, 318, 320, 322, and 324). The social advertisements mixer server 312 may provide unpaid advertisements to a broadcast frontend server 308 for eventual display to a social network user on user terminal 306. The advertisements provided by the social advertisements mixer server 312 may originate from users of the social network and may be broadcast or rebroadcast to other users of the social network. In some implementations, the social advertisements mixer server 312 may retrieve eligible advertisements, rank them based upon data in the databases, and return the highest ranked advertisement. The server 312 may also record interaction statistics (e.g., click-through rates) and store new unpaid advertisements.

In some implementations, the social advertisements mixer server 312 may interact with one or more databases for storing the advertisements and statistics on the advertisements' use. For example, the social advertisements mixer server 312 may interact with a graph targeting database 314, a relationship database 316, a reputation database 318, a content database, 320, a history database 322, and a depth database 324. The databases may include history information and the server 312 may use information in the databases to generate a score for one or more advertisements or broadcasters of the advertisement. An advertisement with the highest score may be displayed to a user requesting display of an advertisement. The score may be specific to interactions between the user requesting display of an advertisement and an advertisement or advertisement's broadcaster. The score may be a global score not specific to interactions with the user requesting display of an advertisement. In some implementations the score of an advertisement and a broadcaster of the advertisement may be combined.

In some implementations, the graph targeting database 314 may store a simple queue of reverse-chronological advertisement broadcast identifications. In response to a social network user lookup, the database may provide the most recent advertisements rebroadcast to the user by other users.

In some implementations, the relationship database 316 may accumulate counts of broadcast interactions between every pair of social network users as a proxy for the strength of their relationship. In other implementations, the relationship database 316 may store acquaintance relationship information such as information about friendship status between users, of interactions between users (e.g., the number of times a user viewed another user's profile, whether one user sent or posted content to another user, etc.), whether users have common acquaintances, whether users belong to the same or similar groups, etc.

In some implementations, the reputation database 318 may accumulate global interaction counts for each user. The reputation database 318 may serve as a roll-up of the relationship database 316 and may to indicate how influential a person is among his acquaintances.

In some implementations, the content database 320 may contain broadcast content and interactions. For example, the database 320 can include advertisements, display information, information about the number of times the advertisement is selected for rebroadcasting, and to and from whom the advertisement is rebroadcast.

In some implementations, the history database 322 may contain a user's previous interactions with every broadcast or rebroadcast advertisement displayed to him.

In some implementations, the depth database 324 may contain statistics on the depth of advertisement penetration through the network. For instance, the database may be indexed by a user identification number and contain counts on the interactions at every depth for advertisements broadcast or rebroadcast by a respective user. In some implementations, the databases 314, 316, 318, 320, 322, and 324 include or are data stores, data layers, or tables.

In some implementations, the paid advertisement broadcast system 302 may include a paid advertisements frontend server 326, an advertiser terminal 340, an advertisements database 336, and numerous servers providing specific services such as servers 328, 330, 332, 334, and 338, which are each discussed in greater detail below.

The paid advertisements server 326 may receive a request from the broadcast frontend server 308 to provide advertisements and, in return, provides the advertisements to the broadcast frontend server 308.

In some implementations, the paid advertisements frontend server 326 communicates with additional servers to determine which advertisements to provide to the broadcast frontend server 308. For example, the paid advertisement frontend server 326 may communicate with a central advertisements server 328 that communicates with several additional servers to determine one or more advertisements to provide to the frontend server 326. An eligibility server 334 may provide a list of advertisements eligible for broadcast to the social network user at user terminal 306. For example, eligible advertisements may have size requirements (e.g. 250×250 pixels) and content requirements (e.g. no animation).

A user backend server 330 may provide information about specific users. This information may include a specific user's history of rebroadcasting or trashing advertisements. An advertisement database 336 may provide statistical information about users and advertisements in addition to that provided by user backend server 330. The advertisement database 336 may hold the information described in relation to databases 314, 316, 318, 320, 322, or 324. One or more of the servers contained within the paid advertisement broadcast system 302 may communicate with the advertisement database 336.

An advertisement provider server 332 may store and provide the requested advertisements. For example, central advertisement server 328 may weigh the list of advertisements provided by eligibility server 334 and may request the chosen one or more advertisements from advertisement provider server 332. The central advertisement server 328 may then receive from server 332 the requested advertisement and provide it to server 326 for eventual forwarding to the broadcast frontend server 308.

In some implementations, an advertiser uses an advertiser terminal 340 for requesting a broadcast of one or more paid advertisements on the social network. For example, the advertiser terminal 340 may communicate with a paid social advertisement frontend server 338 that provides information and a page to the advertiser for purchasing the broadcast of advertisements on the social network. The paid social advertisement frontend server 338 may communicate with the advertisement database 336 to complete the purchasing and to provide information to the paid advertisement broadcast system 302 to perform the broadcast of advertisements.

In some implementations, the advertisements provided by the paid advertisement broadcast system 302 originate from a general advertising system (e.g. a non-social network specific advertising system that also broadcasts advertisements on pages that are not specific to the social network). In some implementations, the functions performed by a server in social network 300 may be performed by more than one server. Further, the functions performed by several servers in social network 300 may be performed by a single server. One skilled in the art would recognize numerous possibilities for providing the functions recited above.

In various implementations, a gadget served by the social network frontend server may display advertisements and receive requests for advertisements. The gadget may forward these requests to the broadcast front end 308, the unpaid advertisement broadcast system 304, or the paid advertisement broadcast system 302 for the operations described above.

Figure 4:
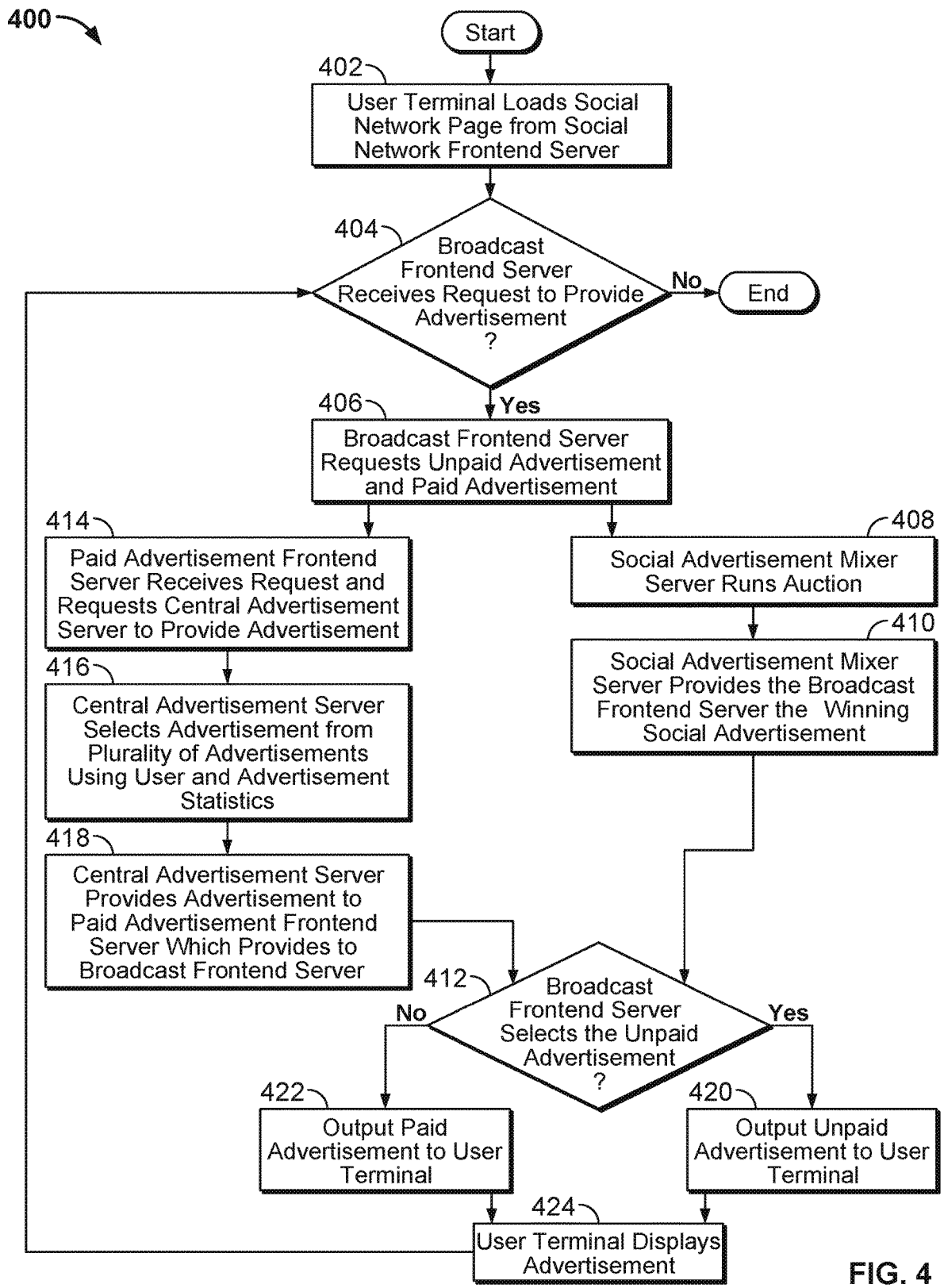
FIG. 4 is a flow chart of an exemplary process 400 for supplying advertisements in a social network.

FIG. 4 is a flow chart of an exemplary process 400 for supplying advertisements in a social network. The process 400 may be performed, for example, by a system such as the system in FIG. 3 and, for clarity of presentation, the description that follows uses the system in FIG. 3 as the basis of an example for describing the process. Another system or combination of systems, however, may be used to perform the process 400, such as the systems of FIGS. 1A and 1B.

In box 402, a user terminal loads a page of a social network from a social network frontend server. For example, the user terminal 306 of the system 300 in FIG. 3 may request that the social network frontend server 310 provide a page of a social network. This page may provide information about a user of the social network, be customized by the user, and may include an ability to chat with the user.

In box 404, a determination is made whether a broadcast frontend server receives a request to provide an advertisement to the user terminal. For example, the user terminal 306 in FIG. 3 may load most of a page of a social network from the social network frontend server 310. The user terminal 306 may not load an advertisement from the social network frontend server 310 and may request this advertisement from the broadcast frontend server 308. If no request is received, the process 400 ends. If a request is received, the process 400 performs the operation of box 406.

In box 406, the broadcast frontend server requests one or more advertisements. In some implementations, the frontend server 308 requests a paid advertisement, in other implementations, server 308 requests unpaid advertisements, and in still other implementations the server 308 requests both paid and unpaid advertisements. If the request is for paid advertisements, the operations of boxes 414-418 may be performed. If the request is for unpaid advertisements, the operations of boxes 408-410 may be performed. The operation starting at boxes 404 and 414 may run concurrently.

In box 408, the social advertiser mixer server has received the request for an advertisement and runs an auction among one or more advertisements. The one or more advertisements may include advertisements targeted to a requesting user. For example, the social advertising mixer server 304 in FIG. 3 receives a request for an advertisement and runs an auction among one or more advertisements to determine which one or more advertisements to provide to the broadcast frontend server 308. For example, the auction may take into account the information of the databases 314, 316, 318, 320, 322, and 324 in determining the winning advertisement or advertisements of the auction. The auction may provide to a user of terminal 306 an advertisement rebroadcast by another user, where the other user's advertisements have been rebroadcast frequently by the user of terminal 306. The auction may instead provide to the user of terminal 306 the first advertisement that was rebroadcast to the user by another user of the social network.

In box 410 the social advertisement mixer server provides to the broadcast frontend server the winning one or more social advertisements from the auction. For example, the social advertisement mixer server 312 in FIG. 3 may provide a winning advertisement to the broadcast frontend server 308.

In box 414, a paid advertisement frontend server receives the request for an advertisement and requests that a central advertisement server provide an advertisement. For example, the paid advertisement frontend server 326 of the system 300 in FIG. 3 may receive a request from the broadcast frontend server 308 to provide it one 250×250 pixel graphic advertisement and one 120 character or less text advertisement. The paid advertisement frontend server 326 then passes this information on to the central advertisement server 328 and requests appropriate advertisements.

In box 416, the central advertisement server selects an advertisement from a plurality of advertisements using user and advertisement statistics. For example, the central advertisement server 328 of FIG. 3 may send the request for one 250×250 pixel advertisement and one 120 character or less text advertisement to the eligibility server 334. The eligibility server 334, which has been updated with information from the advertisement database 336, may return a list of 526 suitable graphic advertisements and a list of 846 suitable text advertisements. The central advertisement server 328 may then weight the lists of received advertisements or run an auction, using statistics on the advertisement from the advertisement database 336 and statistics on the user of terminal 306 from the user backend server 330. The central advertisement server 328 selects a winning graphic advertisement and a winning text advertisement. An actual content of the winning advertisements may be requested and received from an advertisement provider server 332.

In box 418, the central advertisement server provides the selected one or more advertisements from the plurality of advertisements to the paid advertisements frontend server which then provides the advertisements to the broadcast frontend server. For example, central advertisement server 328 in FIG. 3 may provide the winning graphic advertisement and the winning text advertisement to the paid advertisement frontend server 326 which would then provide the same advertisements to the broadcast frontend server 308.

Although not shown, auctions may be run that include both paid and unpaid advertisements. The unpaid advertisements may be assigned a default bid. An unpaid advertisement with a default bid lower than the bid for a paid advertisement may still win an auction. For example, an unpaid advertisement with a default bit of $0.06 may win over a paid advertisement with a bid of $0.09 if the unpaid advertisement was broadcast or rebroadcast by a user with an acquaintance relationship to the recipient user, the acquaintances of the recipient user have clicked through the unpaid advertisement, or the recipient user has rebroadcast or clicked through similar unpaid advertisements. Similar bid modifications may occur for paid advertisements as well.

In box 412, a determination is made whether the broadcast frontend server selects the one or more unpaid advertisements from the advertisements received from the social advertisements mixer server and the paid advertisement frontend server. For example, the broadcast frontend server 308 of FIG. 3 may receive a graphic and text advertisement from the social advertisements mixer 312 and a graphic and text advertisement from the paid advertisement frontend server 336. If the broadcast frontend server selects an advertisement from the social advertisements mixer server, then the operation of box 420 is performed.

If the broadcast frontend server does not select the advertisement from the social advertisements mixer server (i.e. the broadcast frontend server selects the advertisement from the paid advertisement frontend server) then the operation of box 422 is performed. For example, the broadcast frontend server 308 in FIG. 3 may select the graphic advertisement from the social advertisements mixer server 312 because the advertisement has been rebroadcast by more users than the graphic advertisement provided by the paid advertisement frontend server 326. The broadcast frontend server may, however, select the text advertisement from the paid advertisement frontend server 326 for similar reasons.

In box 420, the broadcast frontend server outputs the unpaid advertisement to the user terminal.

In box 422, the broadcast frontend server outputs the paid advertisement to the user terminal.

In box 424, the user terminal displays the one or more advertisements received from the broadcast frontend server for display to a user terminal. For example, the user terminal 306 in FIG. 3 may receive and display the unpaid graphic advertisement and the paid text advertisement on the same page to a user of terminal 306.

Figure 5:
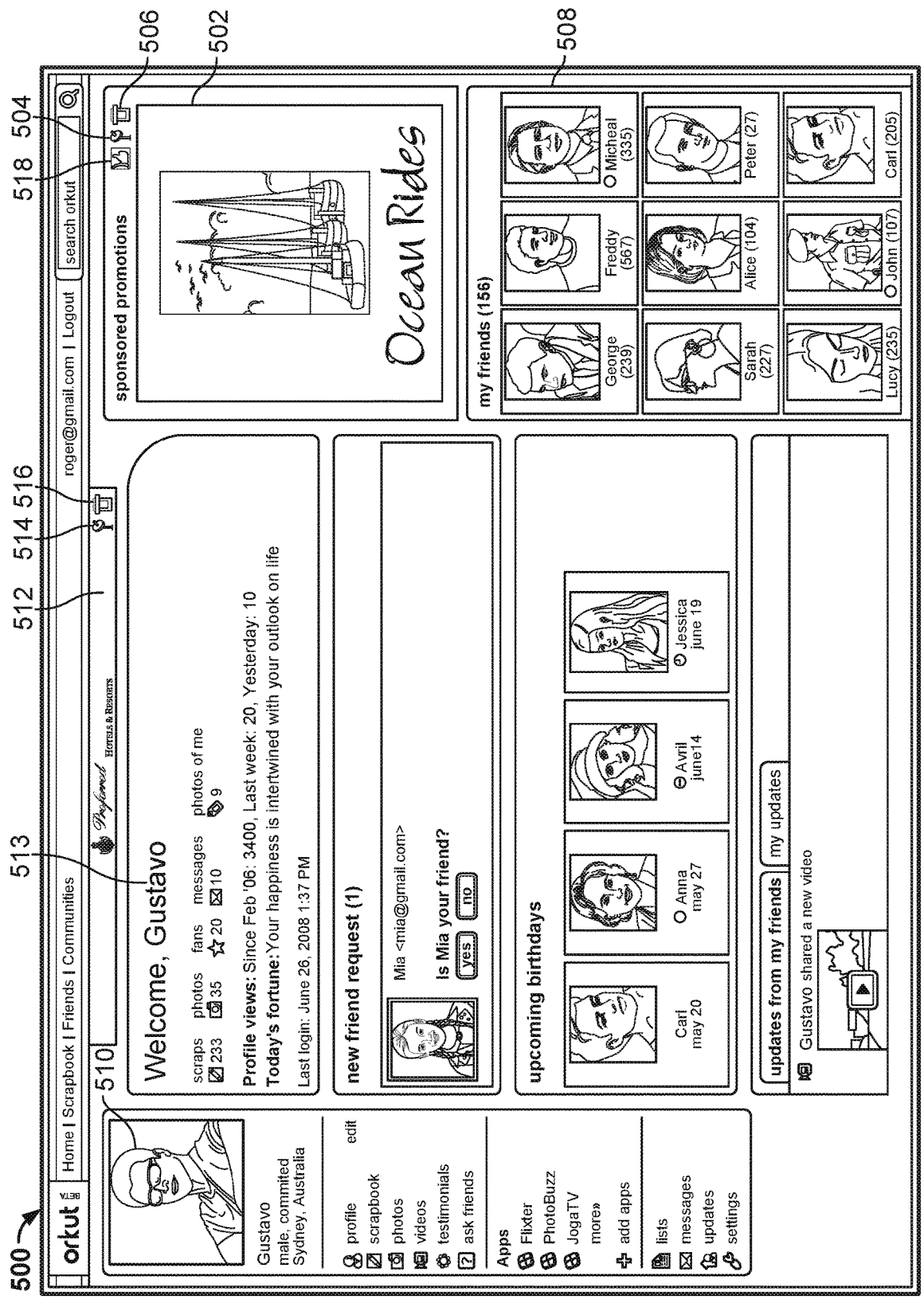
FIG. 5 is an example screenshot of a social network page 500 displaying a broadcast advertisement and a rebroadcast advertisement.

FIG. 5 is an example screenshot of a social network page 500 displaying a broadcast advertisement and a rebroadcast advertisement. The social network page 500 may be a personal page for a user 513 and may include a picture of the user 510 and a list of the user's friends 508. The page may include a first advertisement 502 associated with a broadcast button 504, a trash button 506, a badge 518, and a second advertisement 512 associated with a broadcast button 514 and a trash button 516. The badge 518 may indicate that advertisement 502 has been rebroadcast by a user of the social network. The user 513 may rebroadcast advertisements 502 and 512 to other users of the social network.

In some implementations, page 500 may be an example of page 158 in FIG. 1B. The first advertisement 502 may be an example of advertisement 162, rebroadcast button 504 may be an example of rebroadcast button 160, trash button 506 may be an example of trash button 178, and badge 518 may be an example of badge 158. The second advertisement 512 and the buttons 514 and 516 may serve similar functions.

Figure 6:
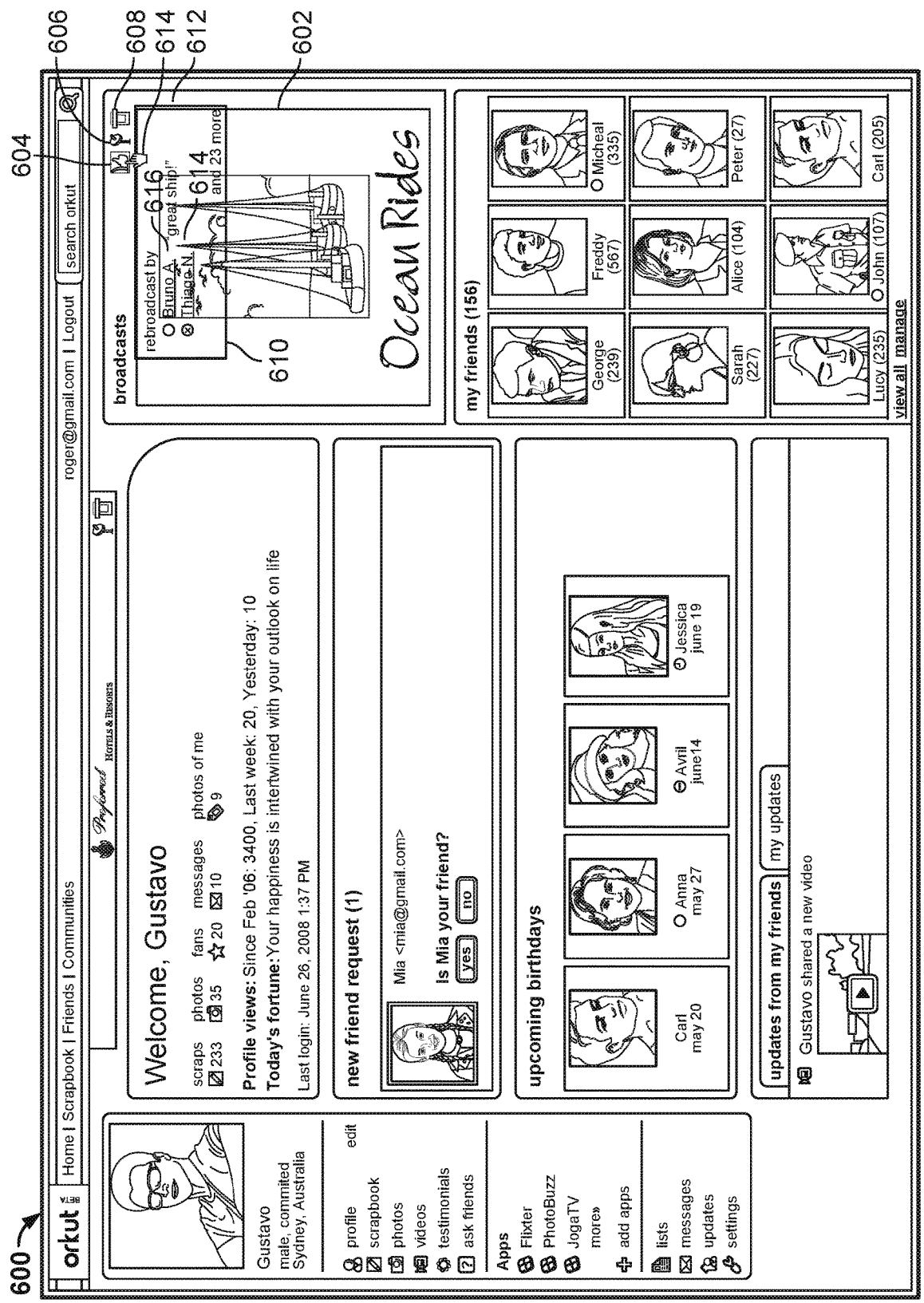
FIG. 6 is an example screenshot of a social network page 600 displaying a rebroadcast advertisement 610.

FIG. 6 is an example screenshot of a social network page 600 displaying a rebroadcast advertisement 610. The page 600 may be an example of page 500 in FIG. 5, but where the user who received advertisement 502 can click on badge 500 to see a dialog box. The page may include a rebroadcast advertisement 602 that is associated with a broadcast button 606, a trash button 608, and a badge 604. Dialog box 610 may appear when the badge 604 is clicked on or otherwise activated by a cursor 614. The dialog box 610 may display information about the rebroadcast advertisement. For example, the dialog box 610 may display that user 616 and user 614 rebroadcast the advertisement. The dialog box may display message 612 that user 616 included for attachment with the rebroadcast advertisement.

Figure 7:
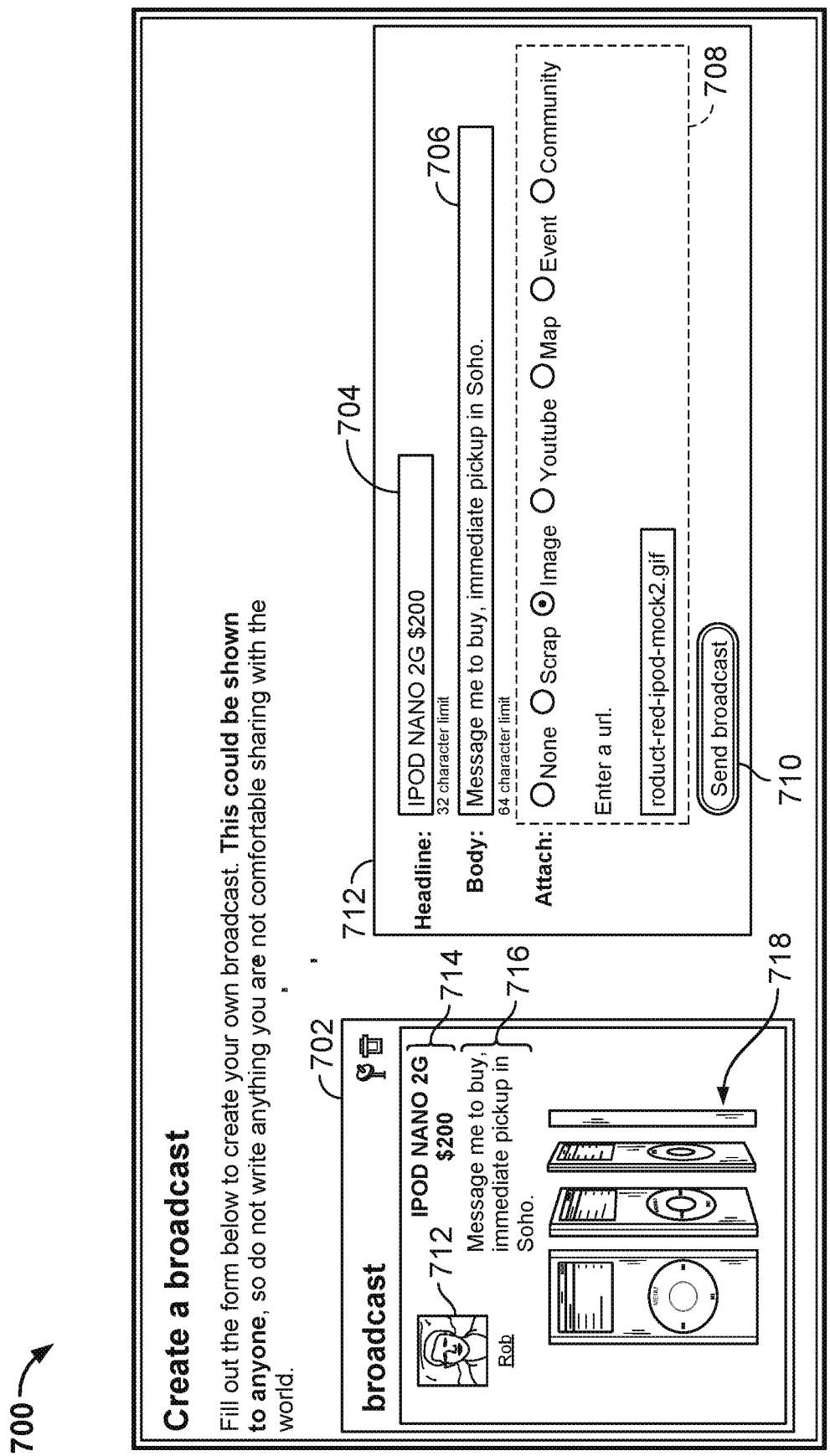
FIG. 7 is an example screenshot of a social network page 700 for broadcasting advertisements.

FIG. 7 is an example screenshot of a social network page 700 for broadcasting advertisements, which permits a user of the social network to broadcast advertisements into the social network. Page 700 may include a form 712 for entering information about the advertisement to be broadcast (the "broadcast advertisement") and an example advertisement 702 that displays how the broadcast advertisement may appear to recipient users.

For example, a user desiring to broadcast an advertisement into the network may enter a desired headline for the advertisement in field 704 and a desired body in field 706. The user may attach various images or interactive components to the advertisement using an attachment selector 708. For example, a user may enter no additional information to the advertisement, may attach an image, display a video, include a map, display an event, or incorporate a community into the advertisement. The user may broadcast the advertisement by selecting the send button 710.

A headline 714, body 716, and attachment 718 corresponding to the information of fields 704 and 706 and attachment selector 708 may appear in the example advertisement 702. The example advertisement may display a picture 712 of the user broadcasting the advertisement.

The advertisement 702 may appear on page 700 as to recipient users on page 500 of FIG. 5 or page 600 of FIG. 6. The broadcast advertisement may or may not include a badge indicating that the message has been broadcast. In some implementations, the broadcast advertisement may be unpaid. The page 700 may be a separate page of a social network or may be a pop-up or dialog box presented on a social network.

Figure 8:
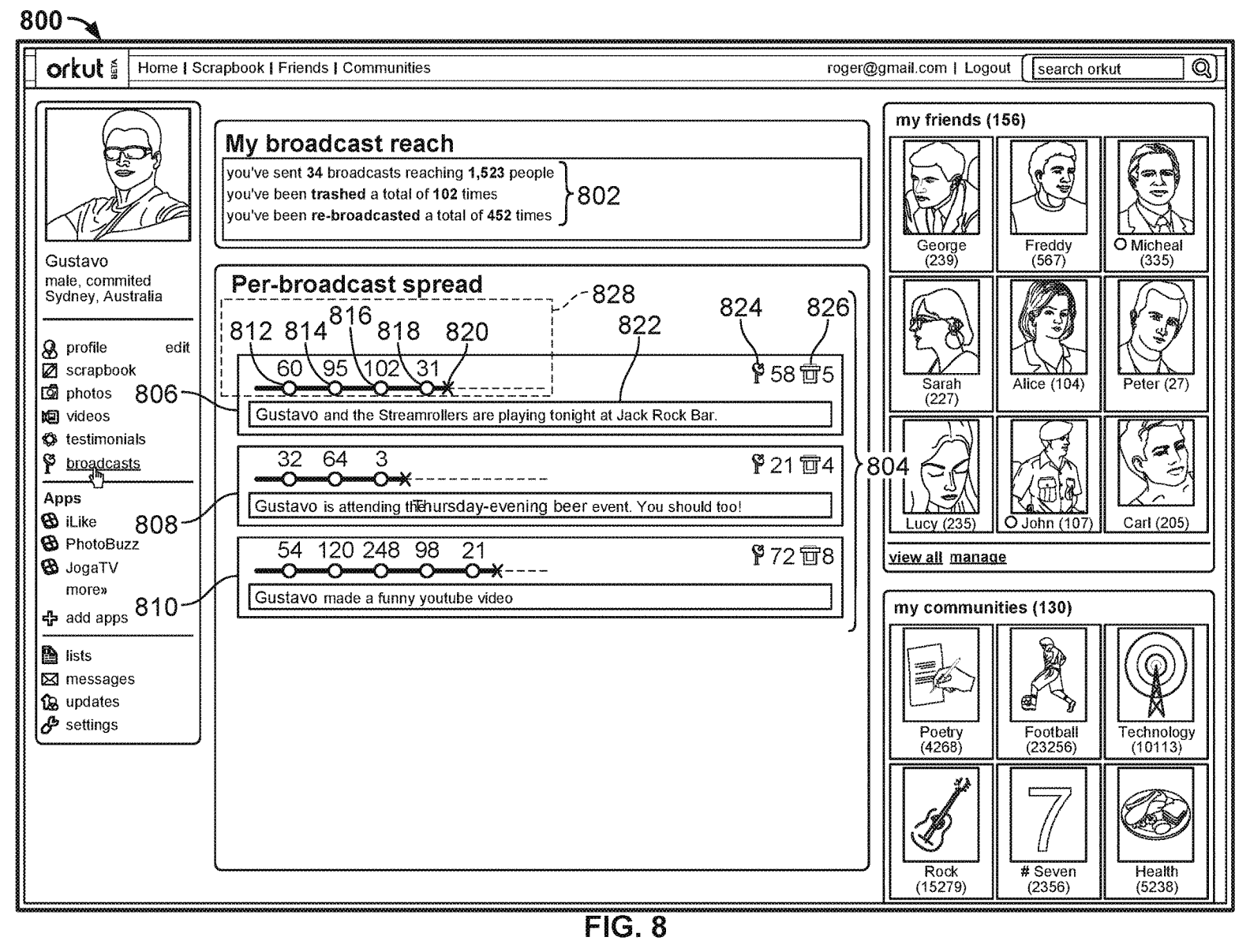

FIG. 8 is an example screenshot of a web page 800 displaying advertisement statistics. In some implementations, the page 800 may be viewed by a user that broadcast (e.g. created or generated) an advertisement using the page 700 of FIG. 7. The page 800 may display information about broadcast advertisements. For example, page 800 may display general statistics 802 on all of the user's broadcast advertisements. The page 800 may also permit the broadcasting user to search through or view comments associated with rebroadcasts of the advertisement.

The general statistics 802 may include an indicator of how may advertisements a user has rebroadcast, a total number of recipient users that viewed the user's broadcast advertisements, a number of times recipient users trashed the broadcast advertisements, and a number of times recipient users rebroadcast the advertisement originally broadcast by the user.

In some implementations, the page 800 may include an indication of how deep a broadcast has penetrated or spread among users of a social network (e.g. broadcast spread info 804). For example, the per-broadcast spread information 804 may include information about different broadcast penetrations for advertisements a user has sent (e.g., an advertisement for Gustavo and the Stream rollers, for Gustavo and the beer event, and Gustavo's YouTube video). The information about broadcast 806 may include an identifier of an advertisement that is the subject of the broadcast 822. The identifier 822 may include the headline and body information input into fields 704 or 706 of FIG. 7 for a particular broadcast. The information about broadcast 806 may include a number of times an associated broadcast advertisement was rebroadcast 824 and a number of times the associated broadcast advertisement was trashed 826.

In some implementations, the information about broadcast 806 may include depth information 828. The depth information 828 may indicate the depth an advertisement has penetrated during broadcast (e.g., the degree of separation from an originating node) and the number of rebroadcasts at each depth. For example, broadcast 806 may have been broadcast to sixty recipient users at a depth of one degree of separation 812 from the broadcasting node, ninety-five recipients at a depth of two 814, one hundred and two recipients at a depth of three 816, thirty-one recipients at a depth of four 31, and no recipients at a depth of five 820.

A depth can indicate a number of associations required to reach a user of the social network from an originating node of the broadcast advertisement. For example, the users at a depth of one may include the users that have an acquaintance relationship with the originating user. The users at a depth of two may indicate users that have an acquaintance relationship with the users at a depth of one and are not the users at a depth of one (e.g., friends of friends).

Users that rebroadcast advertisements may view a page 800 to view information on the rebroadcast advertisements. The page 800 may include information similar to general statistics 802 and spread information 804, but for advertisements that a user rebroadcast. Page 800 can also include information about unpaid advertisements. In other implementations, page 800 includes implementations about paid advertisements.

In some implementations, the page 800 may report a number of selections of the advertisement by recipient users (not displayed). Such selections or clicks may result in the recipient user viewing a broadcasting user's profile page or an advertisement's landing page.

Figure 9:
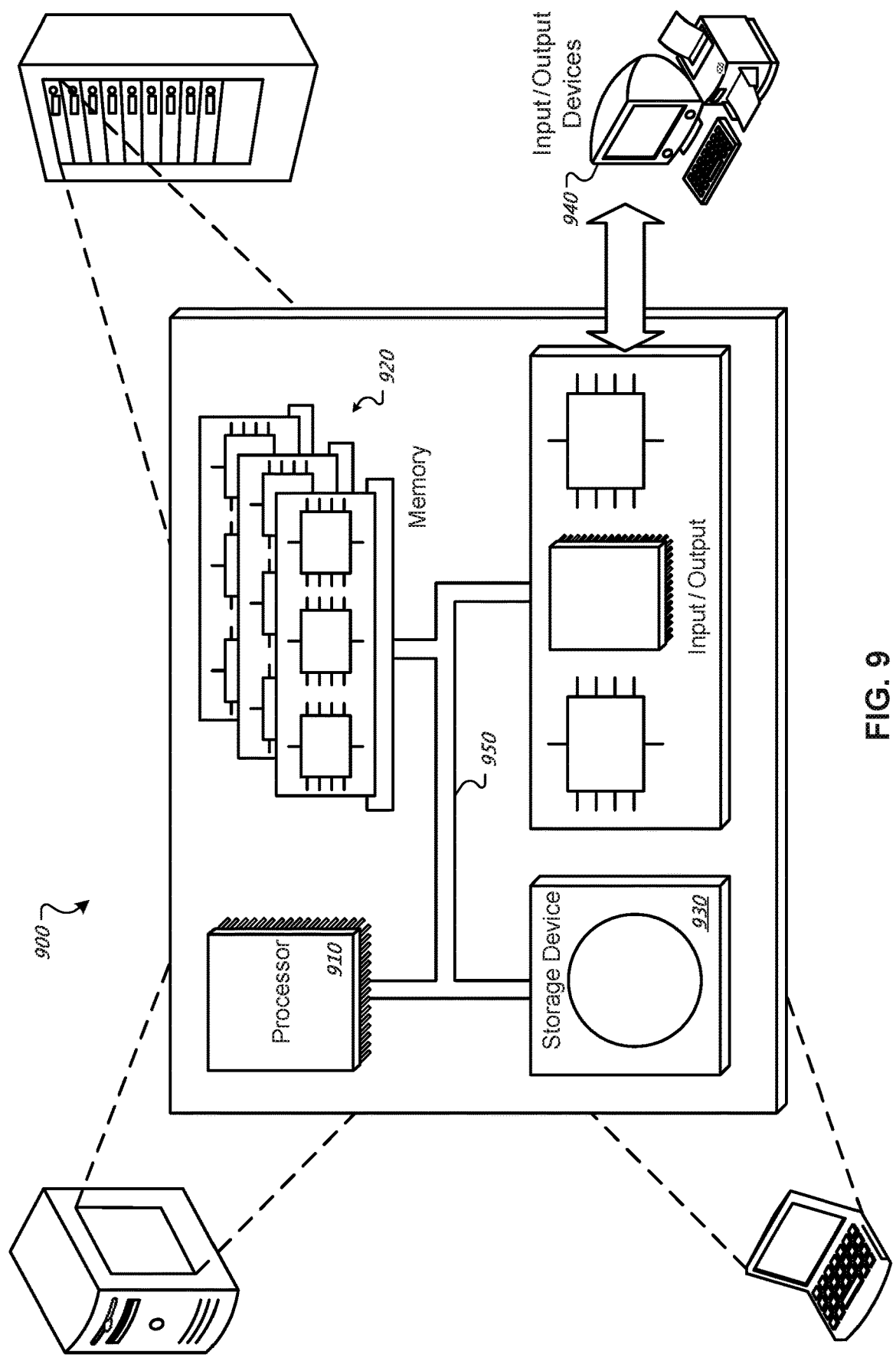
FIG. 9 is a schematic diagram of a computer system 900.

FIG. 9 is a schematic diagram of a computer system 900. The system 900 can be used for the operations described in association with any of the computer-implement methods described previously, according to one implementation. The system 900 is intended to include various forms of digital computers, such as laptops, desktops, workstations, personal digital assistants, servers, blade servers, mainframes, and other appropriate computers. The system 900 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. The processor may be designed using any of a number of architectures. For example, the processor 910 may be a CISC (Complex Instruction Set Computers) processor, a RISC (Reduced Instruction Set Computer) processor, or a MISC (Minimal Instruction Set Computer) processor.

In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
   selecting, by a computer system, a first sponsored content item from among a first plurality of sponsored content items, for presentation on a first web page at a first computing device using an auction process;
   providing, by the computer system, the first sponsored content item for receipt by the first computing device at which a first user has logged into a first account with a social network, so as to cause the first computing device to display the first sponsored content item on the first web page concurrently with a first user interface element and a second user interfaced element, wherein the first user can interact with the first user interface element to cause the first computing device to provide a user interface display that includes a list of users that have previously rebroadcast the first sponsored content item, and wherein user interaction with the second user interface element causes a likelihood that the first sponsored content item will be presented to other users of the social network to decrease;
   receiving, by the computer system, an indication that the first computing device received first user input to request presentation of the user interface display that includes the list of users that have previously rebroadcast the first sponsored content item, wherein the first user input comprises interaction with the first user interface element;
   providing, (i) by the computer system and in response to the computer system receiving the indication that the first computing device received first user input to request presentation of the user interface display, and (ii) to the computing device, indicators that identify the users that have previously rebroadcast the first sponsored content item to facilitate presentation, by the computing device, of the user interface display that includes the list of users that have previously rebroadcast the first sponsored content item;
   receiving, by the computer system, an indication that the first computing device received second user input selecting the second user interface element; and
   in response to receiving the indication that the first computing device received second user input selecting the second user interface element, decreasing the likelihood that the first sponsored content item will be presented to other users of the social network.

2. The computer-implemented method of claim 1, further comprising:
   identifying, by the computer system, a second user that has an acquaintance relationship with the first user in the social network;
   identifying, by the computer system, an opportunity to display, at a second computing device, a sponsored content item as part of a second web page that is different than the first web page, wherein the second computing device is a computing device at which the second user has logged into a second account with the social network;
   identifying, by the computer system, a plurality of sponsored content items that are eligible for display as the sponsored content item on the second web page, including the first sponsored content item and a second sponsored content item, wherein the first sponsored content item is assigned a first bid that is lower than a second bid that is assigned to the second sponsored content item;
   modifying, by the computer system, the first bid that is assigned to the first sponsored content item as a result of the first sponsored content item having been rebroadcast previously by a third user that had an acquaintance relationship in the social network with the second user; and
   providing, by the computer system and based on the modified first bid, the first sponsored content item to the second computing device for display as part of the second web page.

3. The method of claim 1, further comprising:
   receiving, by the computer system, an indication that the first computing device received third user input to rebroadcast the first sponsored content item to cause the first sponsored content item to be eligible for display on a web page that is different than the first web page, wherein the third user input comprises interaction with a third user interface element;
   identifying, by the computer system, a second user that has an acquaintance relationship with the first user in the social network;
   identifying, by the computer system, an opportunity to display, at a second computing device, a sponsored content item as part of a second web page that is different than the first web page, wherein the second computing device is a computing device at which the second user has logged into a second account with the social network;

identifying, by the computer system, a plurality of sponsored content item that are eligible for display as the sponsored content item on the second web page, including the first sponsored content item and a second sponsored content item, wherein the first sponsored content item is assigned a first big that is lower than a second bid that is assigned to the second sponsored content item;

selecting, by the computer system and in response to identifying the opportunity to display the sponsored content item as part of the second web page, the first sponsored content time from among the plurality of sponsored content items that are eligible for display as the sponsored content item on the second web page, based on the first sponsored content item having been rebroadcast previously by the first user and based on the computer system having identified that the second user has an acquaintance relationship with the first user, even though the first sponsored content item was assigned the first bid that is lower than the second bid that was assigned to the second sponsored content item; and providing, by the computer system and in response to the computer system selecting first sponsored content item from among the plurality of sponsored content items, based on the first sponsored content item having been rebroadcast previously by the first user, the first sponsored content time for receipt by the second computing device, so as to cause the second computing device to display the first sponsored content time as a sponsored content item on the second web page.

4. The method of claim 3, wherein the first sponsored content item is displayed on the second computing device as the sponsored content item on the second web page concurrently with a third user interface element, wherein the second user can interact with the third user interface element to initiate a second request to rebroadcast the first sponsored content item.

5. The computer-implemented method of claim 3, wherein the computer system selects the first sponsored content item for display as the sponsored content item on the second web page, based on the first sponsored content item having been rebroadcast previously by a user that had an acquaintance relationship in the social network with the second user.

6. The computer-implemented method of claim 3, wherein the computer system designates the first sponsored content item as being one of the plurality of sponsored content items that are eligible for display by the second computing device as the sponsored content item on the second web page, due to the second user having an acquaintance relationship with the first user.

7. The computer-implemented method of claim 3, wherein:
the first sponsored content item is a sponsored content item that is unpaid; and
the second sponsored content item is a sponsored content item that is paid.

8. The computer-implemented method of claim 7, wherein the first bid that is assigned to the first sponsored content item is a default bid that is assigned to unpaid sponsored content items.

9. The computer-implemented method of claim 3, further comprising receiving, by the computer system and in response to the computer system receiving the indication that the first computing device received the third user input to rebroadcast the first sponsored content item, an indication that the first computing device received additional user input that specified the second user, in distinction to other users of the social network, as a user of the social network to which the first sponsored content item is to be eligible for display.

10. The computer-implemented method of claim 3, further comprising determining, by the computer system and in response to receiving the indication that the first computing device received the third user input to rebroadcast the first sponsored content item, that the first sponsored content item is to be eligible for display to the second user without the first user having specified the second user as a user of the social network to which the first sponsored content item is to be eligible for display.

11. The computer-implemented method of claim 3, wherein the third user input was received by the first computing device through user interaction with a user interface element that was displayed by the first web page concurrent with the display of the first sponsored content item.

12. The method of claim 1, further comprising:
receiving, by the computer system, an indication that the first computing device received third user input to rebroadcast the first sponsored content item to cause the first sponsored content item to be eligible for display on a web page that is different than the first web page, wherein the third user input comprises interaction with a third user interface element, wherein, upon selection of the third user interface element, the first computing device prompts the first user to enter text to be rebroadcast along with the first sponsored content item;
receiving text to be rebroadcast along with the first sponsored content item from the first user; and
rebroadcasting, in response to the user interaction with the third user interface element, the first sponsored content item along with the text to be rebroadcast along with the first sponsored content item.

13. A non-transitory computer-readable medium including instructions that, when executed by at least one programmable processor, cause performance of operations that comprise:
providing, by the computer system, the first sponsored content item for receipt by the first computing device at which a first user has logged into a first account with a social network, so as to cause the first computing device to display the first sponsored content item on the first web page concurrently with a first user interface element and a second user interfaced element, wherein the first user can interact with the first user interface element to cause the first computing device to provide a user interface display that includes a list of users that have previously rebroadcast the first sponsored content item, and wherein user interaction with the second user interface element causes a likelihood that the first sponsored content item will be presented to other users of the social network to decrease;
receiving, by the computer system, an indication that the first computing device received first user input to request presentation of the user interface display that includes the list of users that have previously rebroadcast the first sponsored content item, wherein the first user input comprises interaction with the first user interface element;
providing, (i) by the computer system and in response to the computer system receiving the indication that the first computing device received first user input to request presentation of the user interface display, and (ii) to the computing device, indicators that identify the users that have previously rebroadcast the first sponsored content item to facilitate presentation, by the computing device, of the user interface display that includes the list of users that have previously rebroadcast the first sponsored content item;

receiving, by the computer system, an indication that the first computing device received second user input selecting the second user interface element; and in response to receiving the indication that the first computing device received second user input selecting the second user interface element, decreasing the likelihood that the first sponsored content item will be presented to other users of the social network.

14. The non-transitory computer-readable medium of claim 13, wherein the operations further comprise:

receiving, by the computer system, an indication that the first computing device received third user input to rebroadcast the first sponsored content item to cause the first sponsored content item to be eligible for display on a web page that is different than the first web page, wherein the third user input comprises interaction with a third user interface element;

identifying, by the computer system, a second user that has an acquaintance relationship with the first user in the social network;

identifying, by the computer system, an opportunity to display, at a second computing device, a sponsored content item as part of a second web page that is different than the first web page, wherein the second computing device is a computing device at which the second user has logged into a second account with the social network;

identifying, by the computer system, a plurality of sponsored content items that are eligible for display as the sponsored content item on the second web page, including the first sponsored content item and a second sponsored content item, wherein the first sponsored content item is assigned a first bid that is lower than a second bid that is assigned to the second sponsored content item;

selecting, by the computer system and in response to identifying the opportunity to display the sponsored content item as part of the second web page, the first sponsored content item from among the plurality of sponsored content items that are eligible for display as the sponsored content item on the second web page, based on the first sponsored content item having been rebroadcast previously by the first user and based on the computer system having identified that the second user has an acquaintance relationship with the first user, even though the first sponsored content item was assigned the first bid that is lower than the second bid that was assigned to the second sponsored content item; and providing, by the computer system and in response to the computer system selecting the first sponsored content item from among the plurality of sponsored content items, based on the first sponsored content item having been rebroadcast previously by the first user, the first sponsored content item for receipt by the second computing device, so as to cause the second computing device to display the first sponsored content item as the sponsored content item on the second web page.

15. The non-transitory computer-readable medium of claim 14, wherein the first sponsored content item is displayed on the second computing device as the sponsored content item on the second web page concurrently with a third user interface element, wherein the second user can interact with the third user interface element to initiate a second request to rebroadcast the first sponsored content item.

16. The non-transitory computer-readable medium of claim 14, wherein the operations further comprise:

modifying, by the computer system, the first bid that is assigned to the first sponsored content item as a result of the first sponsored content item having been rebroadcast previously by a user that had an acquaintance relationship in the social network with the second user.

17. The non-transitory computer-readable medium of claim 14, wherein the computer system selects the first sponsored content item for display as the sponsored content item on the second web page, based on the first sponsored content item having been rebroadcast previously by a user that had an acquaintance relationship in the social network with the second user.

18. The non-transitory computer-readable medium of claim 14, wherein the computer system designates the first sponsored content item as being one of the plurality of sponsored content items that are eligible for display by the second computing device as the sponsored content item on the second web page, due to the second user having an acquaintance relationship with the first user.

19. The non-transitory computer-readable medium of claim 14, wherein:

the first sponsored content item is a sponsored content item that is unpaid; and the second sponsored content item is a sponsored content item that is paid.

20. The non-transitory computer-readable medium of claim 19, wherein the first bid that is assigned to the first sponsored content item is a default bid that is assigned to unpaid sponsored content items.

21. The non-transitory computer-readable medium of claim 14, wherein the operations further comprise receiving, by the computer system and in response to the computer system receiving the indication that the first computing device received the third user input to rebroadcast the first sponsored content item, an indication that the first computing device received additional user input that specified the second user, in distinction to other users of the social network, as a user of the social network to which the first sponsored content item is to be eligible for display.

22. The non-transitory computer-readable medium of claim 14, wherein the operations further comprise determining, by the computer system and in response to receiving the indication that the first computing device received the third user input to rebroadcast the first sponsored content item, that the first sponsored content item is to be eligible for display to the second user without the first user having specified the second user as a user of the social network to which the first sponsored content item is to be eligible for display.

23. The non-transitory computer-readable medium of claim 14, wherein the third user input was received by the first computing device through user interaction with a user interface element that was displayed by the first web page concurrent with the display of the first sponsored content item.

24. The non-transitory computer-readable medium of claim 13, the operations further comprising:

receiving, by the computer system, an indication that the first computing device received third user input to rebroadcast the first sponsored content item to cause the first sponsored content item to be eligible for display on a web page that is different than the first web page, wherein the third user input comprises interaction with a third user interface element, wherein, upon selection of the third user interface element, the first computing device prompts the first user to enter text to be rebroadcast along with the first sponsored content item;

receiving text to be rebroadcast along with the first sponsored content item from the first user; and rebroadcasting, in response to the user interaction with the third user interface element, the first sponsored content item along with the text to be rebroadcast along with the first sponsored content item.

* * * * *

UNITED STATES PATENT AND TRADEMARK OFFICE
CERTIFICATE OF CORRECTION

PATENT NO. : 10,803,490 B2
APPLICATION NO. : 15/095244
DATED : October 13, 2020
INVENTOR(S) : Reis et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 139 days.

Signed and Sealed this
Thirty-first Day of August, 2021

Drew Hirshfeld
*Performing the Functions and Duties of the
Under Secretary of Commerce for Intellectual Property and
Director of the United States Patent and Trademark Office*